(12) United States Patent
Inoue

(10) Patent No.: US 11,242,253 B2
(45) Date of Patent: Feb. 8, 2022

(54) METHOD FOR PRODUCING POLYCRYSTALLINE SILICON

(71) Applicant: TOKUYAMA CORPORATION, Yamaguchi (JP)

(72) Inventor: Yuichi Inoue, Yamaguchi (JP)

(73) Assignee: TOKUYAMA CORPORATION, Yamaguchi (JP)

(*) Notice: Subject to any disclaimer, the term of this patent is extended or adjusted under 35 U.S.C. 154(b) by 129 days.

(21) Appl. No.: 16/477,814

(22) PCT Filed: Dec. 28, 2017

(86) PCT No.: PCT/JP2017/047200
§ 371 (c)(1),
(2) Date: Jul. 12, 2019

(87) PCT Pub. No.: WO2018/131500
PCT Pub. Date: Jul. 19, 2018

(65) Prior Publication Data
US 2019/0375642 A1    Dec. 12, 2019

(30) Foreign Application Priority Data
Jan. 16, 2017 (JP) .............................. JP2017-005439

(51) Int. Cl.
*C01B 33/03* (2006.01)
(52) U.S. Cl.
CPC .................................. *C01B 33/03* (2013.01)
(58) Field of Classification Search
CPC ............ B01D 53/0423; B01D 53/0439; B01D 53/002; B01D 53/04; B01D 2259/4009;
(Continued)

(56) References Cited

U.S. PATENT DOCUMENTS 6,475,367 B1 * 11/2002 Toyama ............... C25D 7/0614
205/130
2011/0044878 A1 2/2011 Sakida
(Continued)

FOREIGN PATENT DOCUMENTS

CN  102442672  5/2012
CN  106276919  1/2017
(Continued)

OTHER PUBLICATIONS

See machine translation for CN 106276919, published Jan. 4, 2017.*
(Continued)

*Primary Examiner* — Smita S Patel
(74) *Attorney, Agent, or Firm* — Casimir Jones, SC; Robert A. Goetz

(57) ABSTRACT

Provided is a method which not only prevents (i) accumulation of fine silicon powder in a separation device and a pipe which are provided in steps after passage of a filter and (ii) damage to a pump, but also reduces adhesion of a silane oligomer to the filter. A method, in accordance with an embodiment of the present invention, for producing polycrystalline silicon, includes: a silicon deposition step; a separation step; and a fine powder removal step of removing the fine silicon powder by passing a chlorosilane condensate through a filter.

4 Claims, 1 Drawing Sheet

(58) Field of Classification Search
CPC . B01D 2253/102; C01B 33/03; C01B 33/035; C01B 33/107; C01B 33/00; C01B 33/10784

See application file for complete search history.

(56) References Cited

U.S. PATENT DOCUMENTS

| | | |
|---|---|---|
| 2011/0158857 A1 | 6/2011 | Erk |
| 2012/0198998 A1 | 8/2012 | Kurosawa |
| 2016/0264425 A1* | 9/2016 | Ishida ................ B01D 53/0438 |

FOREIGN PATENT DOCUMENTS

| | | | |
|---|---|---|---|
| CN | 106276919 A * | 1/2017 | ........... C01D 33/107 |
| EP | 2281780 A | 2/2011 | |
| JP | 03-285811 | 12/1991 | |
| JP | 2005-008430 | 1/2005 | |
| JP | 2006/001804 | 1/2006 | |
| JP | 2009-256143 | 11/2009 | |
| JP | 2011-084422 | 4/2011 | |
| JP | 2013-515673 | 5/2013 | |
| KR | 2016-0074466 | 6/2016 | |

OTHER PUBLICATIONS

Extended European Search Report for EP 17892045.0, dated Oct. 8, 2019, 6 pages.
English Translation of International Preliminary Report on Patentability for PCT/JP2017/047200, dated Jul. 18, 2019, 5 pages.
International Search Report for PCT/JP2017/047200, dated Mar. 27, 2018, 1 page.

\* cited by examiner

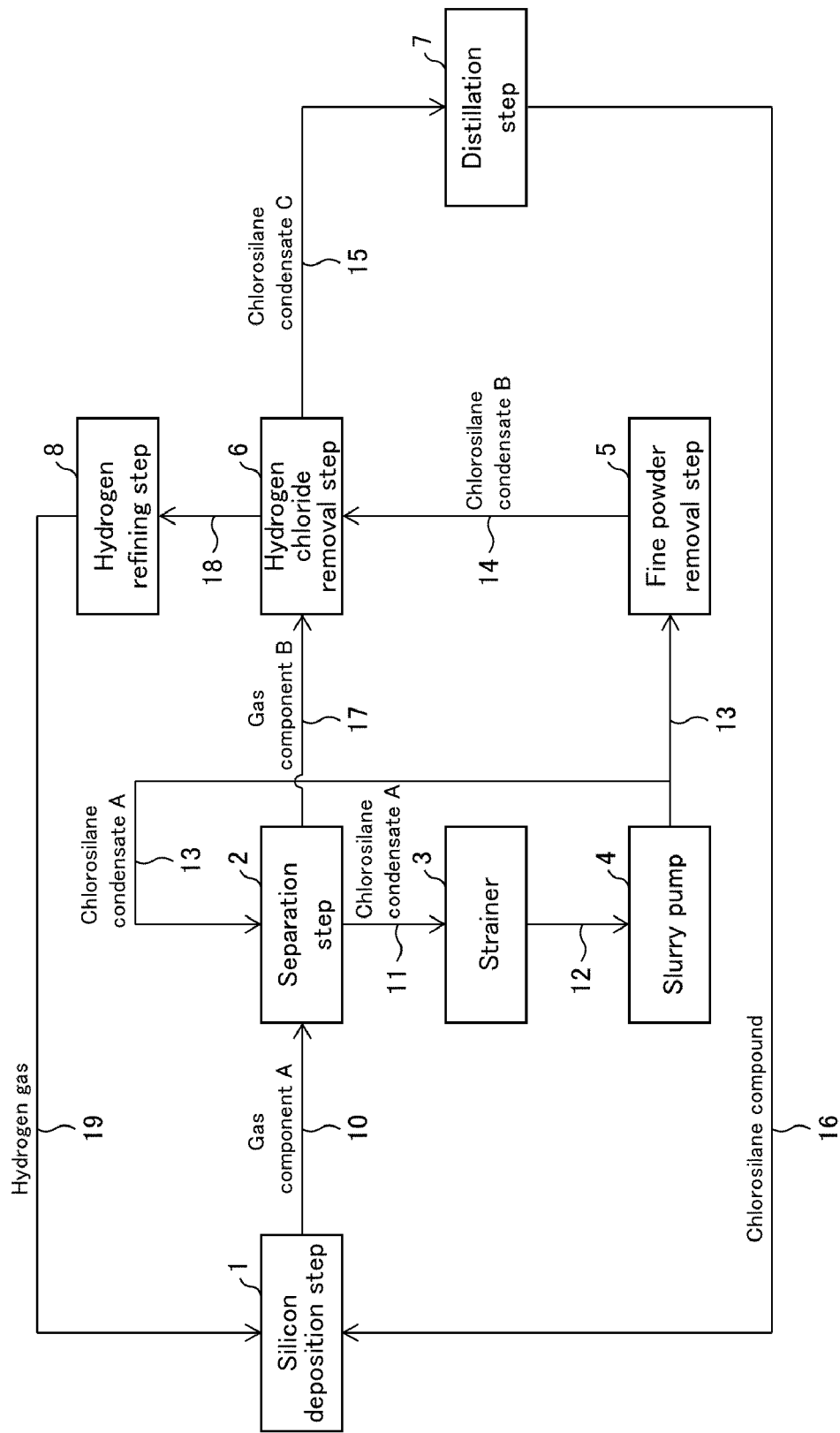

METHOD FOR PRODUCING POLYCRYSTALLINE SILICON

TECHNICAL FIELD

The present invention relates to a method for producing polycrystalline silicon.

BACKGROUND ART

Polycrystalline silicon is suitably used as materials for semiconductor elements, batteries for photovoltaic power generation, etc. for which further development and future increase in demand are expected. In production of such polycrystalline silicon, an apparatus for producing polycrystalline silicon is used, which apparatus includes: a reacting furnace for producing polycrystalline silicon from a mixed gas containing a chlorosilane and hydrogen; and a circulating refining system for reintroducing, into the reacting furnace, hydrogen gas extracted from exhaust gas which has been generated in the reacting furnace.

However, fine silicon powder is secondarily produced in a production process of polycrystalline silicon. As the apparatus for producing polycrystalline silicon continues running, the fine silicon powder adheres to a pipe. Then, the fine silicon powder adhering to the pipe causes a problem of blockage of the pipe and further a problem of damage to a device such as a pump.

In view of the above problems, developed is a method for producing polycrystalline silicon, which method includes the step of removing fine silicon powder which may cause pipe blockage. For example, it is proposed to remove the fine silicon powder by passing, through a filter, the exhaust gas which has been generated in the reacting furnace for producing polycrystalline silicon (for example, Patent Literature 1). Such removal of the fine silicon powder from the exhaust gas makes it possible to prevent the fine silicon powder from accumulating in a pipe, a separation device, etc. in steps after passage of the filter and also to prevent a pump from being damaged by pipe blockage.

In such production of polycrystalline silicon, operation of the apparatus for producing polycrystalline silicon continues for a long term. Then, when the filter is blocked by fine silicon powder, filter regeneration is required. However, there has been a risk that the filter may ignite when the filter is opened and exposed to outside air for operation of the filter regeneration. This is because the exhaust gas contains a silane oligomer ($Si_xH_yCl_z$) in addition to the fine silicon powder, and in filter treatment of the exhaust gas, both the fine silicon powder and the silane oligomer adhere to the filter. In other words, the silane oligomer exhibits a highly dangerous property that the silane oligomer ignites in air.

What is more, when both the fine silicon powder and the silane oligomer adhere to the filter in this way, the fine silicon powder and the silane oligomer firmly adhere to the filter. This causes filter blockage to happen in a shorter period of time and also makes it much more difficult to remove the fine silicon powder and the silane oligomer, as compared to a case where only the fine silicon powder adheres to the filter. As a result, the operation of the filter regeneration becomes more difficult. Consequently, the risk of the above-described ignition is increased.

In light of the above, Patent Literature 2 discloses the following method as a method for producing polycrystalline silicon, which method makes it possible to reduce the risk of ignition of the above filter even in a case where the filter blocked is opened and exposed to outside air. That is, Patent Literature 2 discloses a method for producing polycrystalline silicon, which method includes, for example: STEP 1 of depositing silicon and at the same time discharging exhaust gas containing a silane oligomer and fine silicon powder, by reacting a chlorosilane and hydrogen, which are being heated, in a reaction container; STEP 2 of carrying the exhaust gas having been discharged in STEP 1, while the exhaust gas is kept at a temperature of higher than 105° C.; STEP 3 of obtaining a mixed gas which contains hydrogen and the silane oligomer, by (i) supplying, to a filter, the exhaust gas which has been carried in STEP 2 and which has a temperature of not lower than 105° C., (ii) discharging, from a filtering device, the exhaust gas having a temperature of not lower than 105° C., and (iii) removing the fine silicon powder from the exhaust gas; and STEP 4 of cooling the mixed gas which has been obtained in STEP 3 and separating hydrogen in the form of gas from the mixed gas. According to this method, since the exhaust gas which is supplied to the filter is kept at a temperature of not lower than 105° C., it is possible to suppress, to a low level, adhesion of the silane oligomer contained in the exhaust gas to the filter. As result, even in a case where the filter is opened and exposed to outside air when blocked, a concern about the ignition of the filter can be greatly reduced.

CITATION LIST

Patent Literature

[Patent Literature 1]
Japanese Patent Application Publication Tokukai No. 2005-8430
[Patent Literature 2]
Japanese Patent Application Publication Tokukai No. 2009-256143

SUMMARY OF INVENTION

Technical Problem

However, even with the above-described method, it has not been possible to sufficiently prevent adhesion of the silane oligomer to the filter. Accordingly, it has been a problem to prevent adhesion of the silane oligomer to the filter to a greater degree. Meanwhile, in the above method, in order to allow the exhaust gas passing through the filter to keep a temperature of not lower than 105° C., a heating section for keeping the temperature needs to be provided to the filter and a pipe from the reactor. This makes the apparatus complex. Further, it has been a cumbersome work to operate such heating sections so that the temperature of the exhaust gas is controlled to not lower than 105° C.

The present invention is attained in view of the above problems. An object of the present invention is to provide a simple method for reducing adhesion of a silane oligomer to a filter to a great degree, in preventing (i) accumulation of fine silicon powder in a separation device and a pipe which are provided in steps after passage of the filter and (ii) damage to a pump by removing the fine silicon powder contained in exhaust gas by use of the filter.

Solution to Problem

In order to solve the above problem, the inventor of the present invention carried out diligent studies. As a result, the inventor has found that it is possible to not only prevent (i) accumulation of fine silicon powder in a separation device and a pipe in steps after passage of the filter and (ii) damage to a pump but also reduce adhesion of a silane oligomer to a filter to a great degree, by separating exhaust gas produced in a reacting furnace into a gas component and a chlorosilane condensate which contains the fine silicon powder and then passing the chlorosilane condensate through the filter. In other words, the present invention includes the following method.

A method, in accordance with an embodiment of the present invention, for producing polycrystalline silicon, includes the steps of: a) depositing polycrystalline silicon by reacting a chlorosilane compound and hydrogen together; b) separating, into a chlorosilane condensate and a gas component, exhaust gas which is discharged through the step a), the chlorosilane condensate containing fine silicon powder; and c) removing the fine silicon powder by passing the chlorosilane condensate containing the fine silicon powder through a filter.

Advantageous Effects of Invention

According to an embodiment of the present invention, passing a chlorosilane condensate through a filter allows fine silicon powder contained in the chlorosilane condensate to be filtered and separated by the filter. This makes it possible to prevent the fine silicon powder from being carried to subsequent stages and further to prevent (i) accumulation of the fine silicon powder in a separation device and a pipe in steps after passage of the filter and (ii) damage to a pump.

Further, in the above arrangement, a silane oligomer dissolves into the chlorosilane condensate. This makes it possible to reduce adhesion of the silane oligomer to the filter to a great degree. This leads to excellent removability of the fine silicon powder in a case where the filter is blocked. This consequently makes it possible to more safely and more simply open the filter for exchange or regeneration of the filter.

BRIEF DESCRIPTION OF DRAWINGS

FIG. 1 is a diagram schematically illustrating steps in production of polycrystalline silicon.

DESCRIPTION OF EMBODIMENTS

The following description will discuss an embodiment of the present invention. The present invention is, however, not limited to the embodiment below. The present invention is not limited to the arrangements described below, but may be altered in various ways by a skilled person within the scope of the claims. Specifically, any embodiment based on a proper combination of technical means disclosed in different embodiments is also encompassed in the technical scope of the present invention. Note that all of the patent literatures listed herein are incorporated by reference herein. Any numerical range expressed as "A to B" in the present specification means "not less than A and not more than B (i.e., a range from A to B which includes both A and B)" unless otherwise stated.

A method, in accordance with an embodiment of the present invention, for producing polycrystalline silicon (hereinafter, referred to as "the present production method"), includes the steps of: a) depositing polycrystalline silicon by reacting a chlorosilane compound and hydrogen together; b) separating, into a chlorosilane condensate (hereinafter, referred to as "chlorosilane condensate A") and a gas component (hereinafter, referred to as "gas component B"), exhaust gas (gas component A) which is discharged through the step a), the chlorosilane condensate containing fine silicon powder; and c) removing the fine silicon powder by passing the chlorosilane condensate A containing the fine silicon powder through a filter.

The following description will specifically discuss, with reference to FIG. 1, the steps which are included in the present production method. FIG. 1 is a diagram schematically illustrating the steps in production of polycrystalline silicon.

<1. Silicon Deposition Step 1>

The present production method includes a silicon deposition step 1 of depositing polycrystalline silicon by reacting a chlorosilane compound and hydrogen together. In the silicon deposition step 1, a gas component A 10 is discharged as exhaust gas.

The silicon deposition step 1 is carried out with use of a reaction device whose structure is not limited to any particular structure, and under a reaction condition which is not limited to any particular reaction condition. The silicon deposition step 1 can be carried out with use of a publicly known reaction device and under a publicly known reaction condition. Specifically, the silicon deposition step 1 can be carried out by, for example, the Siemens method (a bell jar method) or a vapor to liquid deposition (VLD) method.

The Siemens method is a method which is carried out as described below. According to the Siemens method, first, a polycrystalline silicon core wire, which is a heating base material, is provided in a reactor (bell jar), and the polycrystalline silicon core wire is electrically heated to a temperature which is not lower than a polycrystalline silicon deposition temperature. Subsequently, with the polycrystalline silicon core wire thus heated, material gas which contains a chlorosilane compound and hydrogen is brought into contact. The contact between the polycrystalline silicon wire and the material gas causes polycrystalline silicon to be deposited on a surface of the polycrystalline silicon core wire, so that a grown polycrystalline silicon rod is obtained.

According to the Siemens method, the polycrystalline silicon core wire which has been electrically heated has a temperature which is not limited to any particular temperature, provided that the temperature is not lower than the polycrystalline silicon deposition temperature. Note, however, that the polycrystalline silicon core wire which has been electrically heated has a temperature in a range of preferably 600° C. to 1250° C., and more preferably 900° C. to 1200° C. so that polycrystalline silicon is efficiently deposited.

The vapor to liquid deposition method includes a sequential method and a continuous method as below. According to the sequential method, first, a base material which is provided in a reactor is heated to a high temperature (e.g., not lower than 600° C.) which is not lower than the polycrystalline silicon deposition temperature. Subsequently, material gas which contains a chlorosilane compound and hydrogen is caused to flow to the base material so as to be in contact with the base material. This contact causes polycrystalline silicon to be deposited on a surface of the base material. Thereafter, the base material is maintained at a high temperature (e.g., 1450° C. to 1700° C.) which is not lower than a melting point of the polycrystalline silicon, so that the polycrystalline silicon thus deposited is melted and dropped so as to be collected. According to the continuous method, first, a base material which is provided in a reactor is heated to a high temperature (e.g., 1450° C. to 1700° C.) which is not lower than a melting point of polycrystalline silicon. Subsequently, material gas which contains a chlorosilane compound and hydrogen is caused to flow to the base material so as to be in contact with the base material. The contact between the base material and the material gas causes polycrystalline silicon to be deposited on a surface of the base material, and causes the polycrystalline silicon to be melted and dropped so as to be obtained.

The silicon deposition step 1 is preferably carried out by the Siemens method so that polycrystalline silicon is efficiently deposited.

Note that a chlorosilane compound herein means a compound which contains a chlorine element and a silicon element. In both the Siemens method and the vapor to liquid deposition method, the chlorosilane compound which is contained in the material gas can be, for example, trichlorosilane or dichlorosilane.

In the silicon deposition step 1, the chlorosilane compound which is contained in the material gas can be a chlorosilane compound 16 which is obtained in a distillation step 7 (described later). In a case where the chlorosilane compound is not sufficient, a chlorosilane compound which has been produced by a publicly known method can be supplied so as to be used to make up for a chlorosilane compound deficiency (not illustrated in FIG. 1). Trichlorosilane which is used as the chlorosilane compound can be commonly produced through a publicly known reaction between metal silicon and hydrogen chloride. In order to remove impurities such as boron, phosphorus, and the like from trichlorosilane which has been obtained by distilling a product of the reaction, it is preferable to further distill the trichlorosilane. By further distilling the trichlorosilane, it is possible to obtain high purity trichlorosilane. In order to obtain high purity polycrystalline silicon, trichlorosilane which is used in the silicon deposition step 1 preferably has a purity of not less than 99.9%.

According to the silicon deposition step 1, the hydrogen which is contained in the material gas is supplied in an amount which is not limited to any particular amount, provided that the amount is in excess of an amount of the chlorosilane compound. Note, however, that the hydrogen is supplied in an amount of preferably not less than 3 mol with respect to 1 mol of the chlorosilane compound so that polycrystalline silicon is efficiently deposited.

According to the silicon deposition step 1, most of the hydrogen which is contained in the material gas can be supplied with hydrogen gas 19, and a hydrogen deficiency can be made up for by hydrogen (not illustrated in FIG. 1) which is obtained by a publicly known production method. For example, such hydrogen can be produced by electrolyzing water. Specifically, it is possible electrolyze water by causing an electric current to flow through an aqueous electrolyte solution which contains an inorganic acid metal salt and/or a metal hydroxide as an electrolyte(s) (i.e., an aqueous solution which contains an inorganic acid metal salt and/or a metal hydroxide as a solute(s)). In order to remove a metallic impurity from hydrogen which has been obtained through electrolysis, it is preferable to wash the hydrogen with water and further pass the hydrogen through a mist filter. By washing the hydrogen with water and further passing the hydrogen through a mist filter, it is possible to obtain hydrogen which substantially contains no metallic impurity. The hydrogen, preferably, further contains no gaseous impurities such as oxygen and water vapor. Oxygen and water vapor can be removed by a publicly known method which is known as a method for obtaining industrial hydrogen. In order to obtain high purity polycrystalline silicon, hydrogen which is used in the silicon deposition step 1 preferably has a purity of not less than 99.99 vol %.

Use of the above-described high purity trichlorosilane and the above-described high purity hydrogen makes it possible to obtain high purity polycrystalline silicon which has a purity of not less than 11 N.

<2. Separation Step 2>

The present production method includes a separation step 2 of separating, into a chlorosilane condensate A 11 and a gas component B 17, exhaust gas (gas component A 10) which is discharged through the silicon deposition step 1.

The gas component A 10 contains a chlorosilane compound, hydrogen, hydrogen chloride, and fine silicon powder, and may further contain a silane oligomer. The chlorosilane compound which is contained in the gas component A 10 consists of (i) a pyrolysate of the chlorosilane compound which has been contained in the material gas and (ii) an unreacted part of the chlorosilane compound. The chlorosilane compound which is contained in the gas component A 10 contains at least one of tetrachlorosilane, trichlorosilane, dichlorosilane, monochlorosilane, hexachlorodisilane, pentachlorodisilane, and the like. The hydrogen which is contained in the gas component A 10 includes (i) hydrogen which is produced by pyrolyzing the chlorosilane compound which has been contained in the material gas and (ii) unreacted hydrogen. The hydrogen chloride which is contained in the gas component A 10 is hydrogen chloride which is secondarily produced from a polycrystalline silicon deposition reaction. The hydrogen chloride is contained in the gas component A 10 at a concentration of, for example, 0.1 mol % to 6 mol %, and, in particular, 0.2 mol % to 3 mol %.

The term "fine silicon powder" herein refers to fine silicon powder having a particle diameter of not more than 40 µm, and preferably 3 µm to 30 µm. The fine silicon powder typically has an average particle diameter of 5 µm to 15 µm. Such fine silicon powder is secondarily produced mainly in a production process of polycrystalline silicon. In particular, the fine silicon powder is noticeably produced in a case where ratios of hydrogen and tetrachlorosilane in a gas which is supplied to the reaction device vary and as a result, an amount of the tetrachlorosilane becomes in excess of an amount of the hydrogen. The fine silicon powder is also produced in, for example, partial collapse of the polycrystalline silicon rod which has been obtained in the silicon deposition step 1, and is contained in the gas component A 10.

The silane oligomer which is contained in the gas component A 10 is secondarily produced in the production process of the polycrystalline silicon. Examples of the silane oligomer include $Si_2HCl_5$, $Si_2H_2Cl_4$, and $Si_2Cl_6$. Note that these silane oligomers have a higher boiling point and more easily condense as compared to tetrachlorosilane.

The chlorosilane condensate A 11 which is obtained in the separation step 2 may contain the fine silicon powder. For example, the chlorosilane condensate A 11 may contain the fine silicon powder in an amount of 0.01% by mass to 0.3% by mass, and particularly 0.05% by mass to 0.2% by mass. Note that the chlorosilane condensate A 11 can be supplied to a step(s) such as a hydrogen chloride removal step 6 (described later), and/or can be used for a purpose which is different from that of the present production method.

The gas component B 17 which is obtained in the separation step 2 contains hydrogen gas and hydrogen chloride as main components. The gas component B 17 (i) further contains, in an amount of approximately several percent by volume, the chlorosilane compound which remains to be condensed and separated in a form of the chlorosilane condensate A 11, and (ii) may contain, in trace amounts, metal silicon-derived boron and metal silicon-derived phosphorus.

In the separation step 2, the gas component A 10 is preferably first cooled. The gas component A 10 typically has a temperature of 200° C. to 270° C. immediately after discharged through the silicon deposition step 1. Unless a heating section for keeping the temperature of the gas component A 10 is provided particularly in a pipe for transferring the gas component A 10 as in the above-described Patent Literature 2, the temperature of the gas component A 10 is generally decreased to a temperature of lower than 105° C. when the gas component A 10 is supplied to the separation step 2. On this account, in a case where removal of the fine silicon powder contained in the exhaust gas is attempted by providing a filter in the pipe which connects between the silicon deposition step 1 and the separation step 2, such an attempt results in noticeable adhesion of not only the fine silicon powder but also a silane oligomer whose adherent property is enhanced at a temperature decreased to the temperature of lower than 105° C.

In the separation step 2, a cooling temperature to which to cool the gas component A 10 is not limited to any particular cooling temperature, provided that the cooling temperature is not higher than a temperature at which the chlorosilane compound is condensed. The cooling temperature can be appropriately determined in consideration of, for example, a cooling capacity of a cooling device to be used. A lower cooling temperature tends to be more effective in condensation of the chlorosilane compound. According to the separation step 2, the gas component A 10 is cooled to a cooling temperature of preferably not higher than −10° C., and more preferably not higher than −30° C. so that the gas component A 10 is more efficiently and more effectively separated into the chlorosilane condensate A 11 and the gas component B 17. Meanwhile, the gas component A 10 is preferably cooled to a cooling temperature of higher than −60° C. from the viewpoint of production cost.

In the separation step 2, a method by which to separate the gas component A 10 is not limited to any particular method, provided that the method allows the gas component A 10 to be separated into the chlorosilane condensate A 11 and the gas component B 17. Note, however, that the gas component A 10 is preferably separated by a condensation removal method. The condensation removal method is a method for separating the gas component A 10 into the chlorosilane condensate A 11 and the gas component B 17, by cooling the gas component A 10 so as to condense the chlorosilane compound.

In the separation step 2, a method by which to cool the gas component A 10 is not limited to any particular method, provided that the method allows the gas component A 10 to be cooled to the cooling temperature falling within the above range. Note, however, that the gas component A 10 can be cooled by a publicly known cooling method. Specific examples of such a cooling method include a cooling method of cooling the gas component A 10 by passing the gas component A 10 through a cooled heat exchanger, and a cooling method of cooling the gas component A 10 with use of a condensate which has been condensed and cooled. These cooling methods can be used alone or in combination.

Next, the separation step 2 is preferably carried out in, for example, a pressure-resistant container and under a high pressure. A pressure under which to carry out the separation step 2 is not limited to any particular pressure, provided that the pressure allows the chlorosilane compound to be completely removed. The pressure can be appropriately determined in consideration of, for example, a capability of a condensation removal device to be used. In order to more effectively separate the gas component A 10 into the chlorosilane condensate A 11 and the gas component B 17, the pressure is preferably not less than 400 kPaG, and more preferably not less than 500 kPaG.

According to the present production method, in order to increase pressure of the gas component A 10 which is to be supplied to the separation step 2, it is possible to provide a pressure application device in advance of carrying out the separation step 2. According to the present production method, in order to protect the pressure application device, it is preferable to carry out preliminary chlorosilane condensation upstream of the pressure application device. Such a preferable arrangement can be employed as a method which is commonly carried out in industrial process design.

<3. Fine Powder Removal Step 5>

The present production method includes a fine powder removal step 5 of removing fine silicon powder by passing, through a filter, the chlorosilane condensate A 11 which contains the fine silicon powder. Passing the chlorosilane condensate A 11 through the filter allows the fine silicon powder contained in the chlorosilane condensate A 11 to be separated by filtering. This makes it possible to prevent the fine silicon powder from being carried to subsequent stages, and further to prevent (i) accumulation of the fine silicon powder in a separation device and a pipe in steps after passage of the filter and (ii) damage to a pump.

The fine powder removal step 5 is carried out after the separation step 2. After the separation step 2, the silane oligomer is in a dissolved state in the chlorosilane condensate. This makes it possible to reduce adhesion of the silane oligomer to the filter. Since a silane oligomer ignites in air, the silane oligomer is a very dangerous compound. Further, when the silane oligomer adheres to the filter, the silane oligomer is firmly fixed to the filter and cannot be easily removed from the filter. An embodiment of the present invention makes it possible to reduce adhesion of the silane oligomer to the filter to a great degree. Accordingly, the filter can be more safely and more simply opened and cleaned. In contrast, in a case where the filter is provided in a step in advance of the separation step 2, there is a risk that the silane oligomer contained in the exhaust gas may adhere in the form of solid to the filter. The inventor of the present invention uniquely has found the above.

The chlorosilane condensate A 11 may contain a chlorosilane compound, a silane oligomer, and fine silicon powder. The chlorosilane compound which is contained in the chlorosilane condensate A 11 is exemplified by, but not particularly limited to, trichlorosilane, dichlorosilane, and tetrachlorosilane.

The silane oligomer and the fine silicon powder which are contained in the chlorosilane condensate A 11 are substances similar to those described in the above silicon deposition step 1.

The filter is not limited to a particular type, provided that the filter is capable of collecting the fine silicon powder. The filter can be, for example, any of element filters or cyclone filters. The filter has a pore size of preferably 1 μm to 5 μm and particularly preferably 2 μm to 4 μm, in consideration of the particle diameter and a removal rate of the fine silicon powder which is contained in the chlorosilane condensate A 11. Further, in view of heat resistance and corrosion resistance, the filter is made of, preferably, a resin material including a polyolefin resin such as polypropylene or polyethylene, a polystyrene resin, an acrylic resin or a fluorine resin, or a metal material such as stainless steel, and more preferably, polypropylene.

In the present production method, it is preferable to provide a plurality of filtering (not illustrated) in parallel to each other so that in a case where performance of a filter deteriorates due to a long-term use, the filter can be replaced by another filter while production is not stopped. Such filter replacement is possible by switching one of the plurality of filtering devices provided in parallel to each other to another filtering device.

Further, it is preferable to provide, in advance of the fine powder removal step 5, the step of carrying the chlorosilane condensate A 11 to the filter by use of a slurry pump 4. In this arrangement, even in a case where the chlorosilane condensate A 11, which is a mixture of a solid and a liquid, flows in, the slurry pump 4 does not break down and therefore, the chlorosilane condensate can be carried to the filter.

Note that as described above, the chlorosilane condensate A 11 may contain the fine silicon powder in an amount of 0.01% by mass to 0.3% by mass, and particularly 0.05% by mass to 0.2% by mass. This concentration of the fine silicon powder is lower than a solid content concentration of a slurry (approximately 1% by mass to 5% by mass) for which a slurry pump is generally used. Though the solid content concentration of the chlorosilane condensate A 11 is lower than the concentration of a slurry for which a common slurry pump is used, it is preferable to use the slurry pump. This is because in a case where the chlorosilane condensate A 11 is carried by use of a common pump, a pump member is easily abraded and damaged early due to the fine silicon powder. Use of the slurry pump eliminates a concern about this problem, and is therefore preferable.

The slurry pump 4 is not limited to a particular pump, provided that the slurry pump is a pump for carrying a mixture of a solid and a liquid or a viscous liquid. The slurry pump can be a publicly known slurry pump. Examples of the slurry pump 4 include a canned pump and a centrifugal pump.

It is preferable to include the step of circulating, to the separation step 2, part of the chlorosilane condensate A 11 which is to be carried to the fine powder removal step 5 (that is, the chlorosilane condensate A 13 which is discharged from the slurry pump). This arrangement allows for a trouble-free operation of the pump even in a case where the filter is blocked. Therefore, the arrangement is preferable. Note that though it is possible to alternatively circulate the chlorosilane condensate which has passed through the filter, it is more preferable to circulate the chlorosilane condensate which has not yet passed through the filter. This is because the latter case can exert an advantageous effect more than the former case, in a case where the filter is blocked.

Further, circulating part of the chlorosilane condensate to the separation step 2 allows for a cleaning a device which is used in the separation step 2. For example, it is possible to wash off a solid adhering to the device which is used in the separation step 2, by spraying, like a shower, the part of the chlorosilane condensate.

Furthermore, it is more preferable that the chlorosilane condensate A 11 be carried to the slurry pump 4 after the chlorosilane condensate A 11 is passed through a strainer 3. In this arrangement, the chlorosilane condensate A 11 can be carried to the slurry pump 4 after preliminary removal of coarse silicon particles and coarse non-silicon foreign matters which are contained in the chlorosilane condensate A 11. This can prevent damage to the slurry pump 4.

The strainer 3 is a sieve for removing foreign matters which is larger than the fine silicon powder. The strainer 3 is not limited to a particular strainer, provide that the strainer 3 has larger meshes than the filter which is used in the fine powder removal step. The strainer 3 can be selected in accordance with a size of foreign matters which a pump in use can tolerate. For example, the strainer 3 has a pore size of preferably 0.1 mm to 0.25 mm and more preferably 0.1 mm to 0.2 mm.

Note that in FIG. 1, the chlorosilane condensate A 11 which has passed through the strainer 3 is expressed as "CHLOROSILANE CONDENSATE A" 12, the chlorosilane condensate A 11 which has passed through the slurry pump 4 is expressed as "CHLOROSILANE CONDENSATE A" 13, and the chlorosilane condensate which is obtained through the fine powder removal step 5 is expressed as "CHLOROSILANE CONDENSATE B" 14.

<4. Hydrogen Chloride Removal Step 6>

The present production method includes the hydrogen chloride removal step 6 of obtaining a gas component C 18, by removing hydrogen chloride by bringing the gas component B 17 into contact with a chlorosilane solution.

The chlorosilane solution which is used in the hydrogen chloride removal step 6 is a liquid which contains a chlorosilane compound. The chlorosilane compound is exemplified by, but not particularly limited to, trichlorosilane, dichlorosilane, and tetrachlorosilane.

The chlorosilane solution which is used in the hydrogen chloride removal step 6 can contain part of the chlorosilane condensate A 11 which is obtained in the separation step 2. Further, the chlorosilane solution which is used in the hydrogen chloride removal step 6 can contain the chlorosilane condensate B 14 which is obtained through the fine powder removal step 5.

In the hydrogen chloride removal step 6, hydrogen chloride which is contained in the gas component B 17 is removed by bringing the hydrogen chloride which is contained in the gas component B 17 into contact with the chlorosilane solution so as to cause the chlorosilane solution to absorb the hydrogen chloride.

In the hydrogen chloride removal step 6, the chlorosilane solution which has been cooled is preferably used so that the hydrogen chloride is efficiently removed from the gas component B 17. The chlorosilane solution preferably has a temperature of preferably not higher than −40° C., and more preferably not higher than −50° C. so that the hydrogen chloride is efficiently removed from the gas component B 17.

In the hydrogen chloride removal step 6, the chlorosilane solution, which the gas component B 17 is brought into contact with, contains the chlorosilane compound which is arranged so that the hydrogen chloride is efficiently removed. That is, the chlorosilane compound is arranged such that a total amount of silane contained in the chlorosilane compound is preferably not less than 130 mol and more preferably not less than 140 mol, with respect to 1 mol of the hydrogen chloride which is contained in the gas component B 17. Further, in order to reduce running costs, the chlorosilane compound is arranged such that the total amount of the silane which is contained in the chlorosilane compound is preferably not more than 150 mol with respect to 1 mol of the hydrogen chloride which is contained in the gas component B 17.

A method of bringing the chlorosilane solution into contact with the gas component B 17 in the hydrogen chloride removal step 6 is exemplified by, but not particularly limited to, publicly known methods such as a bubbling method, a packed tower method, and a shower method. Note that the hydrogen chloride removal step 6 can be carried out in publicly known equipment such as a gas-liquid contact column.

A gas component which is obtained by bringing the chlorosilane solution into contact with the gas component B 17 is designated as the gas component C 18. The gas component C 18 which is obtained in the hydrogen chloride removal step 6 contains hydrogen gas as a main component. The gas component C 18 further (i) contains the chlorosilane compound in an amount of approximately several percent by volume and (ii) contains the hydrogen chloride which remains to be removed. The hydrogen chloride is contained in the gas component C 18 at a concentration of not more than 1 ppm, and more preferably not more than 0.1 ppm.

<5. Distillation Step 7>

The present production method preferably includes the distillation step 7 of distilling the chlorosilane condensate B 14 after the fine powder removal step 5, and circulating, to the silicon deposition step 1, the chlorosilane compound 16 which is obtained by distillation of the chlorosilane condensate B 14. This allows the chlorosilane compound 16 which is obtained after the chlorosilane solution B 14 has been distilled to be reused as material gas for use in the silicon deposition step 1. Alternatively, in the distillation step, a chlorosilane condensate C 15 after the hydrogen chloride removal step 6 can be distilled, as illustrated in FIG. 1.

Note that, if necessary, it is possible to provide a refining step which is carried out before the chlorosilane compound 16 which is obtained after the chlorosilane solution B 14 has been distilled is supplied to the silicon deposition step 1.

<6. Hydrogen Refining Step 8>

The present production method includes a hydrogen refining step 8 of obtaining the hydrogen gas 19, by removing the chlorosilane compound by bringing the gas component C 18 into contact with activated carbon.

The hydrogen refining step 8 is carried out, for example, by supplying the gas component C 18 to an adsorption tower which is filled with an activated carbon layer or activated carbon. In a case where the gas component C 18 is brought into contact with the activated carbon in the adsorption tower, the chlorosilane compound which is contained in the gas component C 18 is adsorbed and removed by the activated carbon. This makes it possible to obtain the hydrogen gas 19.

The activated carbon which is used in the hydrogen refining step 8 is not limited to any particular activated carbon, provided that the activated carbon allows the chlorosilane compound to be removed from the gas component C 18. As the activated carbon which is used in the hydrogen refining step 8, it is possible to use publicly known activated carbon.

Activated carbon in general easily adsorbs moisture which is contained in the air. In a case where activated carbon which has adsorbed moisture is used in the hydrogen refining step 8, the moisture may react with the chlorosilane compound which is contained in the gas component C 18, so that a silicon oxide may be produced on the activated carbon. Production of the silicon oxide on the activated carbon causes an inconvenience(s) such as blocking of a pipe and/or contamination, and thus is not preferable. Thus, the activated carbon which is used in the hydrogen refining step 8 is preferably used in the hydrogen refining step 8 after moisture which has been adsorbed by the activated carbon is removed. The moisture can be removed by at least one of a pressure reduction treatment and a heating treatment.

In order to completely remove the moisture which is contained in the activated carbon, it is possible to carry out the pressure reduction treatment, at a pressure of preferably not more than $1 \times 10^4$ Pa, and more preferably not more than $1 \times 10^3$ Pa in terms of an absolute pressure, by maintaining a reduced pressure state for a certain period of time.

In order to completely remove the moisture which is contained in the activated carbon, it is possible to carry out the heating treatment, at a temperature of preferably 80° C. to 130° C., by maintaining a heated state for a certain period of time. In order to completely remove the moisture which is contained in the activated carbon, it is preferable to carry out the heating treatment under flow of inert gas or under reduced pressure. Examples of the inert gas which is used in the heating treatment include nitrogen, helium, and argon. A preferable reduced pressure at which to carry out the heating treatment under reduced pressure is identical to the reduced pressure at which to carry out the pressure reduction treatment.

Each of the pressure reduction treatment and the heating treatment is preferably carried out until the moisture which is contained in the activated carbon is completely removed. It can be confirmed, by measuring a dew point of an atmosphere, whether the moisture has been completely removed. In order to completely remove the moisture which is contained in the activated carbon, it is preferable to remove the moisture until the dew point of the atmosphere reaches preferably not higher than −30° C., and more preferably not higher than −40° C.

In the hydrogen refining step 8, an adsorption temperature and an adsorption pressure at each of which to adsorb and remove the chlorosilane compound by bringing the gas component C 18 into contact with the activated carbon are not limited to any particular adsorption temperature and any particular adsorption pressure, respectively, provided that the adsorption temperature and the adsorption pressure each allow the chlorosilane compound to be completely adsorbed and removed. The adsorption temperature is preferably −30° C. to 50° C., and more preferably −10° C. to 40° C. The adsorption pressure is preferably not less than 1300 kPaG, and more preferably not less than 1500 kPaG. The adsorption temperature which falls within the above range and the adsorption pressure which falls within the above range each allow the chlorosilane compound to be completely adsorbed and removed from the gas component C 18.

In the hydrogen refining step 8, a velocity at which to pass the gas component C 18 through the adsorption tower which is filled with the activated carbon layer or the activated carbon (i.e., a passage velocity) is not limited to any particular velocity, provided that the velocity allows the chlorosilane compound which is contained in the gas component C 18 to be completely adsorbed and removed. The passage velocity can be appropriately determined in consideration of a capability of the adsorption tower which adsorbs and removes the chlorosilane compound. In the hydrogen refining step 8, the passage velocity at which the gas component C 18 is passed through the adsorption tower is preferably 50 $Hr^{-1}$ to 500 $Hr^{-1}$, and more preferably 50 $Hr^{-1}$ to 150 $Hr^{-1}$ in terms of a spatial velocity (SV).

The gas component C 18 may contain a small amount of hydrogen chloride. Note, however, that the small amount of hydrogen chloride, together with the chlorosilane compound, is adsorbed by the activated carbon in the hydrogen refining step 8.

The hydrogen gas 19 which is obtained in the hydrogen refining step 8 is preferably hydrogen gas which has a purity of not less than 99.99 vol %. The chlorosilane compound contained in the hydrogen gas 19 which is obtained in the hydrogen refining step 8 contains silane in a total amount of preferably not more than 3 ppm, and more preferably not more than 1 ppm. The above arrangement allows the hydrogen gas 19 which is obtained in the hydrogen refining step 8 to be high purity hydrogen gas.

The hydrogen gas 19 which is obtained in the hydrogen refining step 8 is high purity hydrogen gas and thus can be cyclically used, as it is, as material gas for use in the silicon deposition step 1. Furthermore, the hydrogen gas 19 can be used as hydrogen which is used in a reaction of reduction from tetrachlorosilane to trichlorosilane, or can be used as a hydrogen source in production of silica which is made from tetrachlorosilane (not illustrated in FIG. 1).

The present production method preferably includes the step of circulating, to the silicon deposition step 1, the hydrogen gas 19 which is obtained through the hydrogen refining step 8. The above arrangement, in which hydrogen gas is reused, makes it possible to provide a method for producing polycrystalline silicon at a lighter environmental load and at low production cost.

<Recap>

An embodiment of the present invention can be arranged as below.

[1] A method for producing polycrystalline silicon, including the steps of: a) depositing polycrystalline silicon by reacting a chlorosilane compound and hydrogen together; b) separating, into a chlorosilane condensate and a gas component, exhaust gas which is discharged through the step a), the chlorosilane condensate containing fine silicon powder; and c) removing the fine silicon powder by passing the chlorosilane condensate containing the fine silicon powder through a filter.

[2] The method as described in the above [1], wherein: the chlorosilane condensate is carried to the filter by use of a slurry pump.

[3] The method as described in the above [2], further including the step of: circulating, to the step b), part of the chlorosilane condensate discharged from the slurry pump.

[4] The method as described in the above [2] or [3], wherein: the chlorosilane condensate is carried to the slurry pump after having passed through a strainer.

[5] The method as described in any one of the above [1] to [4], wherein: the fine silicon powder is contained in an amount of 0.01% by mass to 0.3% by mass in the chlorosilane condensate.

[6] The method as described in any one of the above [1] to [5], wherein: the filter has a pore size of 1 μm to 5 μm.

[7] The method as described in any one of the above [1] to [6], wherein: the chlorosilane condensate having been subjected to the step c) is distilled so that a chlorosilane compound is produced, and the chlorosilane compound is circulated to the step a).

EXAMPLES

The following description will more specifically describe the present invention with reference to Examples. However, the present invention is not limited by the Examples.

Example 1

Polycrystalline silicon was produced through the steps illustrated in FIG. 1. In a silicon deposition step 1, polycrystalline silicon was deposited by the Siemens method. In a bell jar (reactor) having an inner capacity of 10 m$^3$, 50 sets of inverted U polycrystalline silicon core wires were provided to an electrode which was provided on a base plate of the bell jar. The temperature in the bell jar was adjusted, by an amount of an electric current which was passed through each of the polycrystalline silicon core wires, so that the temperature of the polycrystalline silicon core wires would be maintained at approximately 1000° C. Under the above condition, the hydrogen gas A 19, which was material gas, and a chlorosilane compound 16, which had been made gaseous, were supplied to the inside of the bell jar so that a ratio of hydrogen with respect to the chlorosilane compound 16 would be 7. As a result, the polycrystalline silicon was deposited. Note also that most of the chlorosilane compound 16 here was trichlorosilane.

In the silicon deposition step 1, a gas component A 10 was obtained in an amount of 24000 Nm$^3$/hour from the bell jar. When the gas component A 10 was discharged from the bell jar, the gas component A 10 had a temperature of 230° C.

The gas component A 10 sent to a separation step 2 had a temperature decreased to 100° C. Next, the gas component A 10 was cooled to −15° C. with use of a chiller (cooler), so that a gas component B 17 and a chlorosilane condensate A 11 were obtained. Table 1 shows respective compositions of the gas component B 17 and the chlorosilane condensate A 11. Note that in Table 1, values of the composition, except for fine silicon powder, of each of the gas component B 17 and the chlorosilane condensate A 11 were obtained as a result of analysis by gas chromatography. Further, conditions of fine silicon particles having a particle diameter of not more than 40 μm was confirmed by laser diffraction. As a result, it was confirmed that fine silicon particles having a particle diameter in a range of 3 μm to 30 μm were present in an amount shown in Table 1 (average particle diameter of 10 μm).

TABLE 1

| | TCS (mol %) | STC (mol %) | DCS (mol %) | Hydrogen (mol %) | Hydrogen chloride (mol %) | Silane oligomer (mol %) | Fine Silicon powder (mass %) |
|---|---|---|---|---|---|---|---|
| Gas component B 17 | 1.5 | 0.3 | 0.4 | 97 | 0.8 | — | — |
| Chlorosilane condensate A 11 | 60 | 29.5 | 9 | 0 | 1 | 0.5 | 0.05 |

Note that in Table 1, TCS represents trichlorosilane, STC represents tetrachlorosilane (silicon tetrachloride), and DCS represents dichlorosilane.

In a fine powder removal step 5, a chlorosilane condensate A 13, which had been obtained in the separation step 2 and contained the fine silicon powder, was passed through a filter. This filter was made of a polypropylene filter material (manufactured by Fuji Filter Manufacturing Co., Ltd.) having a pore size of 3 μm. The chlorosilane condensate A 13 supplied to the filter had a liquid temperature of −15° C. Further, the chlorosilane condensate A 11 was supplied to the filter by using a canned pump as a slurry pump.

In production of polycrystalline silicon, for 100 hours in which a differential pressure of the filter was increased from initial approximately 50 kPa to approximately 200 kPa, the fine silicon powder accumulated in neither pipes nor equipment which were provided in a stage subsequent to the fine powder removal step 5 (e.g., in a hydrogen chloride removal step 6). Further, for the 100 hours, no damage to the slurry pump 4 occurred. Therefore, the pipes and the equipment were stably operated. After the 100 hours of operation for the production of polycrystalline silicon, the filter was opened since the filter was blocked by the fine silicon powder. Then, no adhesion of a silane oligomer to the filter was observed. Accordingly, the filter could be more safely regenerated by dusting off and simple cleaning of the filter.

Comparative Example 1

In Comparative Example 1, operation as in the case of Example 1 was carried out except that the fine powder removal step 5 was provided not in a flow path of the chlorosilane condensate A 13 but in a flow path of the gas component A 10 which was discharged in the silicon deposition step 1. Note that in this production of polycrystalline silicon, the gas component A 10 supplied to the filter had a temperature of 100° C.

In this production of polycrystalline silicon, the differential pressure of the filter was increased from initial approximately 5 kPa to approximately 15 kPa within only two hours. Also thereafter, the differential pressure of the filter kept rapidly increasing. Further, because of the risk of ignition that might occur due to adhesion of a silane oligomer to the filter, it was necessary to carefully repeat a delicate filter cleaning operation while the filter was opened, when the filter was regenerated.

INDUSTRIAL APPLICABILITY

An embodiment of the present invention is suitably applied to a method for producing polycrystalline silicon.

REFERENCE SIGNS LIST

1 Silicon deposition step
2 Separation step
3 Strainer
4 Slurry pump
5 Fine powder removal step
6 Hydrogen chloride removal step
7 Distillation step
8 Hydrogen refining step
10 Gas component A
11, 12, 13 Chlorosilane condensate A
14 Chlorosilane condensate B
15 Chlorosilane condensate C
16 Chlorosilane compound
17 Gas component B
18 Gas component C
19 Hydrogen gas

The invention claimed is:

1. A method for producing a polycrystalline silicon, comprising the steps of:
   a) depositing the polycrystalline silicon by reacting a chlorosilane compound and a hydrogen together;
   b) separating an exhaust gas which is discharged through step a) into a chlorosilane condensate and a gas component, wherein the chlorosilane condensate contains a fine silicon powder in an amount of 0.01% by mass to 0.3% by mass, wherein the gas component contains a hydrogen gas and a hydrogen chloride;
   c) removing the fine silicon powder by passing the chlorosilane condensate containing the fine silicon powder through a filter by use of a slurry pump to prevent an accumulation of the fine silicon powder in a separation device and a pipe which are provided in steps after passage of the filter and damage to the slurry pump, and further to reduce adhesion of a silane oligomer to the filter; and
   d) distilling the chlorosilane condensate after the fine silicon powder removal in step c) to obtain a chlorosilane compound and circulating the chlorosilane compound to step a).

2. The method as set forth in claim 1, further comprising circulating part of the chlorosilane condensate discharged from the slurry pump to step b).

3. The method as set forth in claim 2, wherein:
the chlorosilane condensate is carried to the slurry pump after the chlorosilane condensate is passed through a strainer.

4. The method as set forth in claim 1, wherein:
the filter has a pore size of 1 μm to 5 μm.

* * * * *